(12) United States Patent
Boeke et al.

(10) Patent No.: US 9,080,452 B2
(45) Date of Patent: Jul. 14, 2015

(54) GAS TURBINE ENGINE AIRFOIL WITH VANE PLATFORM COOLING PASSAGE

(71) Applicant: United Technologies Corporation, Hartford, CT (US)

(72) Inventors: Mark A. Boeke, Plainville, CT (US); Shawn J. Gregg, Wethersfield, CT (US); Sarah Riley, Glastonbury, CT (US); Jeffrey J. DeGray, Hampden, MA (US); Richard M. Salzillo, Plantsville, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 476 days.

(21) Appl. No.: 13/630,419

(22) Filed: Sep. 28, 2012

(65) Prior Publication Data
US 2014/0219778 A1    Aug. 7, 2014

(51) Int. Cl.
| | |
|---|---|
| *F01D 5/18* | (2006.01) |
| *F01D 25/12* | (2006.01) |
| *F01D 25/24* | (2006.01) |
| *F01D 9/02* | (2006.01) |

(52) U.S. Cl.
CPC *F01D 5/186* (2013.01); *F01D 9/02* (2013.01); *F01D 25/12* (2013.01); *F01D 25/246* (2013.01); *F05D 2260/204* (2013.01); *Y02T 50/672* (2013.01); *Y02T 50/676* (2013.01)

(58) Field of Classification Search
CPC ........... F01D 5/18; F01D 5/186; F01D 25/12; F01D 25/246; F01D 9/02; F01D 9/06

USPC ..... 416/96 R, 97 R, 97 A, 90 R, 92; 415/115, 415/116
See application file for complete search history.

(56) References Cited

U.S. PATENT DOCUMENTS

| | | | |
|---|---|---|---|
| 6,406,260 | B1 | 6/2002 | Trindade et al. |
| 6,672,836 | B2 | 1/2004 | Merry |
| 2003/0131980 | A1 | 7/2003 | DeMarche et al. |
| 2005/0058545 | A1 | 3/2005 | Cardenas |
| 2007/0253816 | A1 | 11/2007 | Walz et al. |
| 2010/0206512 | A1 | 8/2010 | Dube et al. |
| 2010/0266386 | A1 | 10/2010 | Broomer et al. |
| 2011/0236199 | A1 | 9/2011 | Bergman et al. |

OTHER PUBLICATIONS

International Search Report & Written Opinion for PCT/US2013/061840 completed Dec. 19, 2013.
International Preliminary Report on Patentability for PCT/US2013/061840 mail date of Apr. 9, 2015.

*Primary Examiner* — Edward Look
*Assistant Examiner* — Maxime Adjagbe
(74) *Attorney, Agent, or Firm* — Carlson, Gaskey & Olds, P.C.

(57) ABSTRACT

A stator vane for a gas turbine engine includes an airfoil extending in a radial direction and supported by a platform having a gas flowpath surface. A cooling passage is arranged in the platform and includes a circumferential passage that is fluidly connected to an inlet passage extending through and edge of the platform, and film cooling holes extending from the gas flowpath surface to the circumferential passage, radial extending passage through the edge of the platform. A void is interconnected to at least one of the radially extending passage and the inlet passage.

14 Claims, 3 Drawing Sheets

GAS TURBINE ENGINE AIRFOIL WITH VANE PLATFORM COOLING PASSAGE

BACKGROUND

This disclosure relates to a gas turbine engine, and more particularly to turbine vane platform cooling arrangements that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

High pressure turbine vanes are subjected to high operating temperatures and frequently require film cooling on flow path surfaces. Film cooling is facilitated by machining cooling holes to an internal passage or non-flow path pocket surface. A typical solution is to create a cooling air passage under the attachment rail formed by a cantilevered core used in the casting process and fed from the vane pocket.

One example core configuration uses a pair of spaced apart radially extending core portions in the rail that are interconnected by a circumferentially extending core portion within the outer platform. One of the resultant radial passages is welded shut. This type of arrangement is typical for many platforms. Another example core configuration utilizes a single core portion extending through an annular flange of the platform. The core portion branches from the inlet into three dead-ended passages. However, no film cooling holes are connected to these passages, nor is there a circumferentially extending core portion. A core for a typical doublet turbine vane configuration uses two discrete core portions, one for each vane. A single inlet radially extending inlet core portion is joined to a circumferentially extending core portion, which is connected to film cooling holes.

SUMMARY

In one exemplary embodiment, a stator vane for a gas turbine engine includes an airfoil extending in a radial direction and supported by a platform having a gas flowpath surface. A cooling passage is arranged in the platform and includes a circumferential passage that is fluidly connected to an inlet passage extending through and edge of the platform, and film cooling holes extending from the gas flowpath surface to the circumferential passage, radial extending passage through the edge of the platform. A void is interconnected to at least one of the radially extending passage and the inlet passage.

In a further embodiment of any of the above, the void includes multiple circumferentially spaced dead-ended radial passages separated circumferentially by ribs.

In a further embodiment of any of the above, the platform includes a circumferential support to which the airfoil is mounted and an annular flange extends in the radial direction from the circumferential support, the cooling passage arranged within the annular flange.

In a further embodiment of any of the above, the stator vane includes inner and outer platforms radially spaced apart from one another and adjoined by the airfoil. The cooling passage is provided in the outer platform.

In a further embodiment of any of the above, multiple airfoils adjoin the inner and outer platforms.

In a further embodiment of any of the above, multiple cooling passages extend to the edge provided by the annular flange, with at least one of the passages blocked by a plug weld to provide at least one of the dead-ended radial passages.

In a further embodiment of any of the above, the cooling passage includes radial passages spaced from the edge and without a plug weld.

In a further embodiment of any of the above, the cooling passage includes four dead-end radial passages.

In a further embodiment of any of the above, the ribs are elongated in the radial direction.

In a further embodiment of any of the above, a rib provides an L-shaped structure.

In a further embodiment of any of the above, the stator vane includes a core arranged within and providing the cooling passage. The core includes multiple core portions extending beyond the edge of the platform.

In a further embodiment of any of the above, the first connecting portion interconnects an inlet core portion providing the inlet passage and a first core portion. Both inlet and first core portions extend beyond the edge.

In a further embodiment of any of the above, the second connecting portion interconnects a third core portion extending beyond the edge to a circumferential core portion, which is also connected to the inlet and first core portions.

In a further embodiment of any of the above, the third connecting portion interconnects radial core portions to one another. The radial core portions provide at least some of the dead-ended radial passages.

BRIEF DESCRIPTION OF THE DRAWINGS

The disclosure can be further understood by reference to the following detailed description when considered in connection with the accompanying drawings wherein.

DETAILED DESCRIPTION

Figures 1, 5:
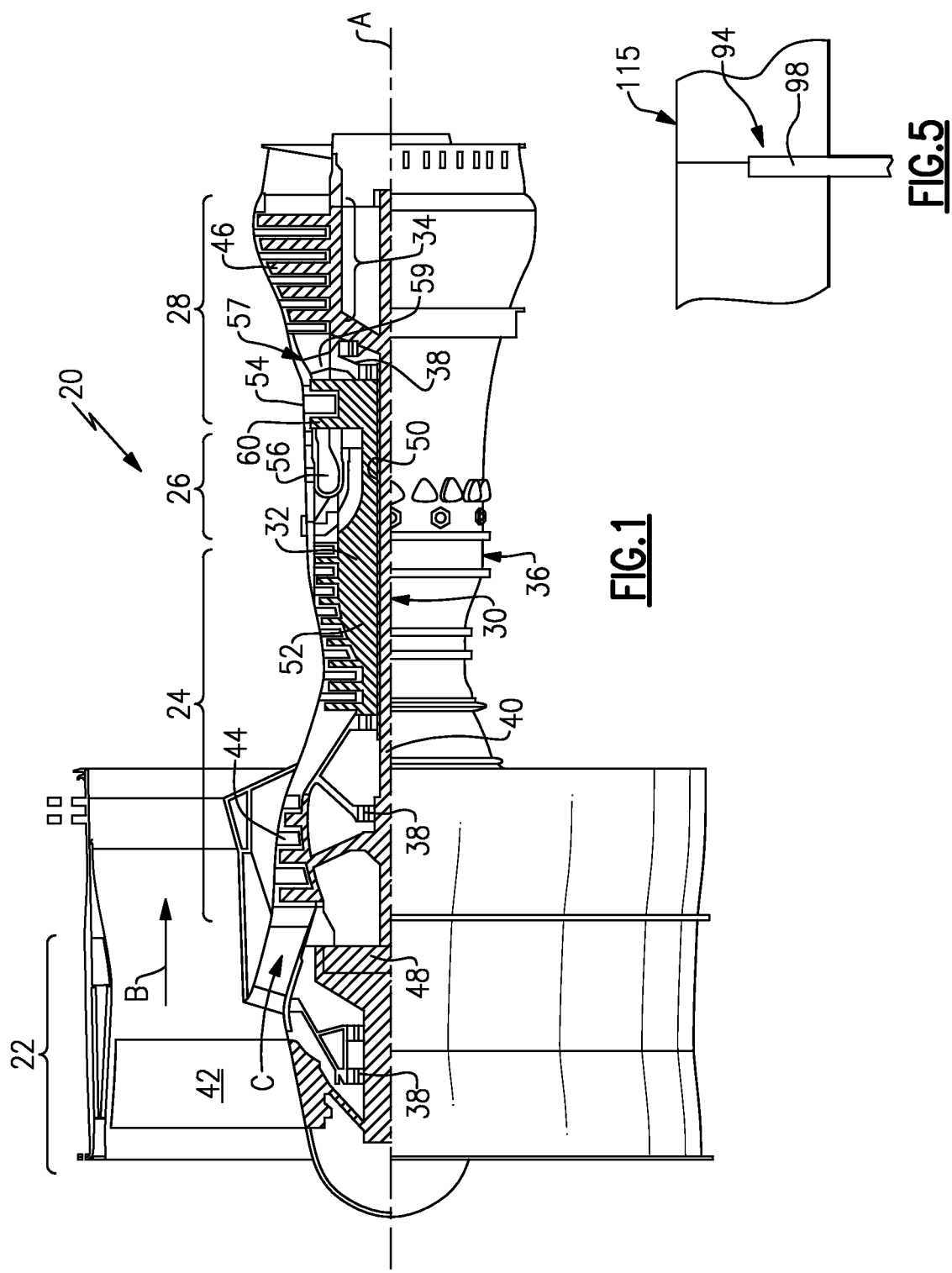
FIG. 1 schematically illustrates a gas turbine engine embodiment.
FIG. 5 is a schematic view depicting a core held in a mold.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or first) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

Figure 2:
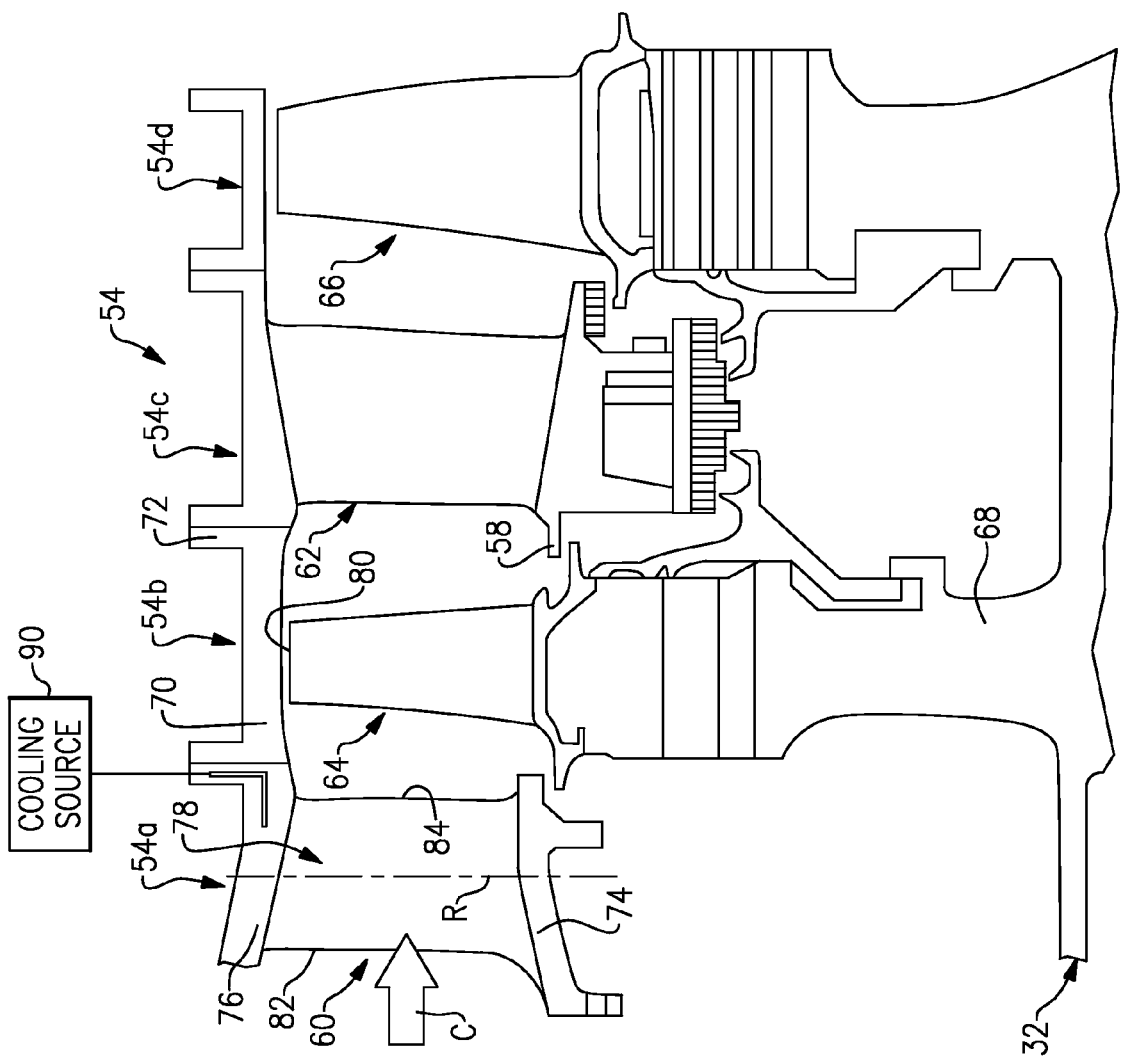
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62.

The turbine blades each include a tip 80 adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

Figure 3:
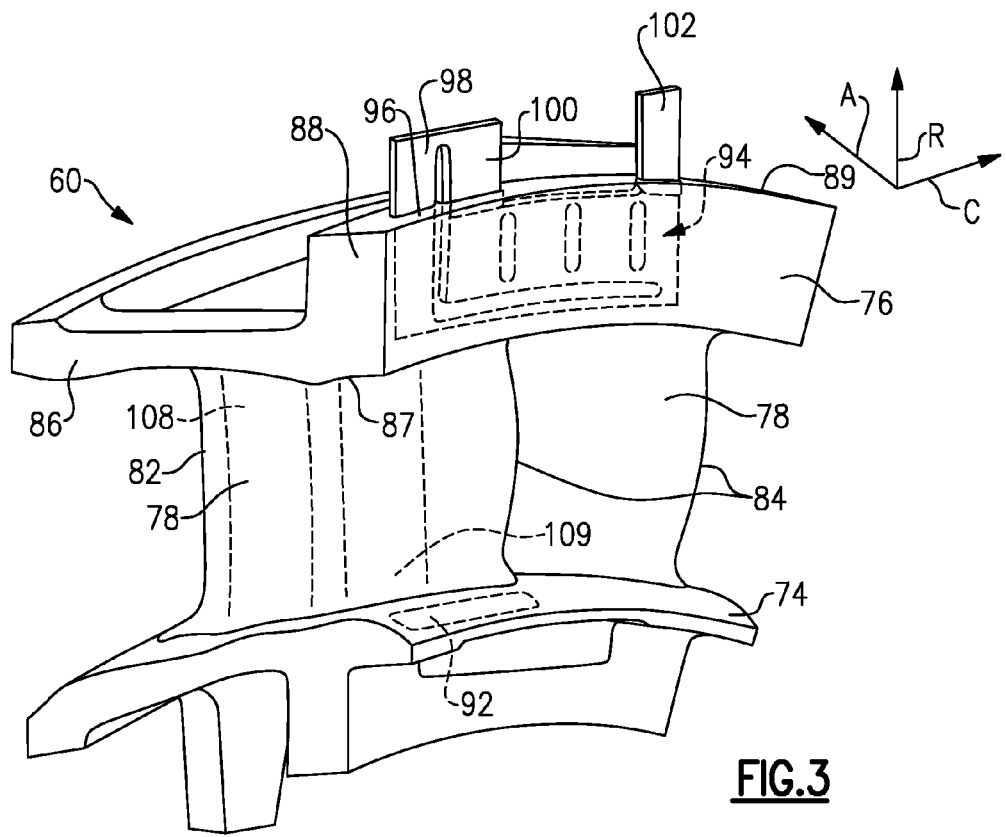
FIG. 3 is a perspective view of a turbine vane for the high pressure turbine section shown in FIG. 2.

Each vane 60 includes an inner platform 74 and an outer platform 76 respectively defining inner and outer flow paths. The platforms 74, 76 are interconnected by an airfoil 78 extending in a radial direction R. It should be understood that the turbine vanes may be discrete from one another or arranged in integrated clusters. For example, a "doublet" vane cluster is illustrated in FIG. 3. With continuing reference to FIG. 2, the airfoil 78 provides leading and trailing edges 82, 84. Cooling passages within the turbine vane 60, 62 are provided cooling fluid from a cooling source 90, such as compressor bleed air that can be fed from the outer or inner diameter direction.

The turbine vanes 60, 62 are constructed from a high strength, heat resistant material such as a nickel-based or cobalt-based superalloy, or of a high temperature, stress resistant ceramic or composite material. In cooled configurations, internal fluid passages and external cooling apertures can provide for a combination of impingement and film cooling. Other internal cooling approaches may be used such as trip strips, pedestals or other convective cooling techniques. In addition, one or more thermal barrier coatings, abrasion-resistant coatings or other protective coatings may be applied to the turbine vane 60, 62.

Referring to FIG. 3, the turbine vane 60, 62 is of a "doublet" type having two airfoils 78. It should be understood that the disclosed cooling arrangement may also be used with single vanes or other multi-vaned configurations. The airfoils 78 extend between and are interconnected to the inner and outer platform 74, 76. Cooling passageways 92, 94 are respectively provided in the inner and outer platforms 74, 76 and are provided by correspondingly shaped core structures. The passageways/core structures are indicated by dashed lines. Similarly, the airfoil 78 includes airfoil cooling passages 108, 109. Fluid from a cooling source 90, which can be fed from the outer and/or inner vane pockets (shown in FIG. 2), is provided to the cooling passages 92, 94, 108, 109.

With continuing reference to FIG. 3, the core 94 is arranged in the outer platform 76, which includes a circumferential support 86 adjoining an annular flange 88. The circumferential support 86 provides the structural support for the airfoils 78, transferring the load into the turbine case, and provides a gas flowpath surface 87. The annular flange 88 extends in a radial direction, and the core 94 is arranged within this annular flange 88, or rail.

The core 94 includes an inlet core portion 98 and first and second core portions 100, 102, which extend beyond an edge 89 of the annular flange 88. These core portions 98, 100, 102 are retained by a mold 115 during the casting process, which is schematically illustrated in FIG. 5. In one typical casting process, the cores are formed from ceramic. The coated cores are arranged in a wax mold and then encased in wax to provide a wax structure having the shape of the desired turbine vane. The wax structure is then coated with the ceramic slurry, and wax is melted from the dried ceramic slurry structure. The resulting hardened ceramic mold and cores provide the contours of the turbine vane and its cooling passages. Molten metal is poured into the ceramic mold, and the metal is permitted to cool. The hardened ceramic is then removed to reveal the rough turbine vane, which may be subsequently finish-machined.

Figure 4:
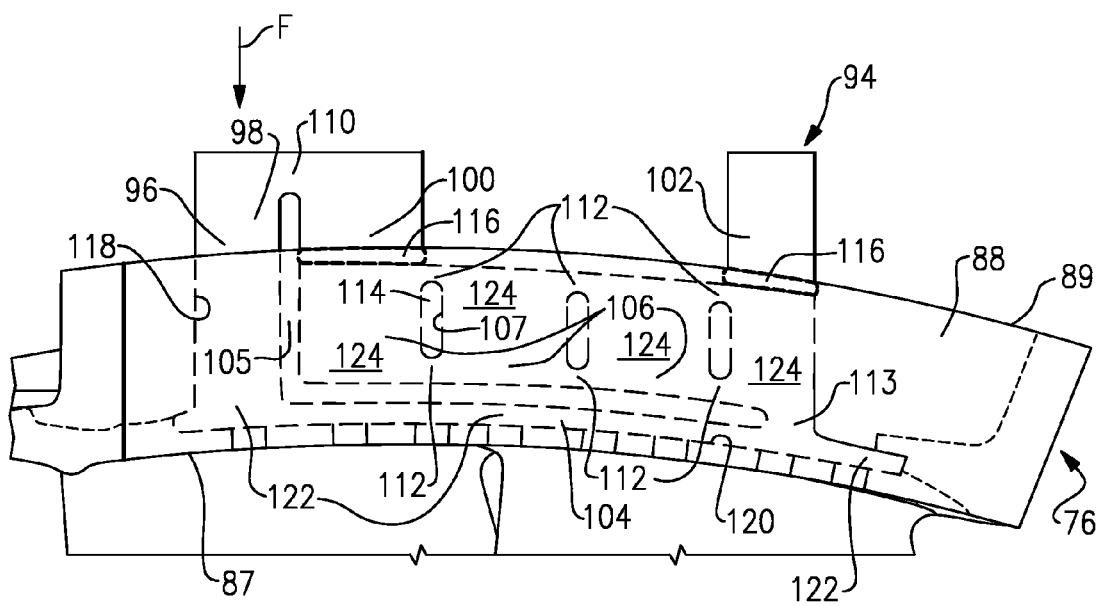
FIG. 4 is a perspective view of a core structure and corresponding cooling passage in an outer platform of the turbine vane of FIG. 3.

Referring to FIG. 4, the first and second core portions 100, 102 create undesired additional openings in the edge 89 subsequent to casting. As a result, the openings created by the first and second core portions 100, 102 are closed by plug welds 116, creating several dead-ended passages 124 or voids. Providing three core portions (98, 100, 102) extending from the edge 89 provided stability and desired core location throughout the casting process.

The inlet core portion 98 (providing inlet passage 118) is interconnected to a circumferential core portion 104 (providing circumferential passage 120). A first connecting portion 110 interconnects the inlet core portion 98 to the first core portion 100. A second connecting portion 113 interconnects the second core portion 102 to the circumferential core portion 104.

The core 94 also includes radial core portions 106, which are arranged circumferentially between the first and second core portions 100, 102. The radial core portions 106 are spaced radially inward from the edge 89, such that additional plug welds are not required thus providing additional dead-ended passages 124 or voids. The radial core portions 106 are joined to one another by third connecting portions 112, which provide radially elongated slots 107 that correspond to ribs 114 in the cast structure. An L-shaped rib 105 is provided between the dead-ended passages 124 and the inlet and circumferential passages 118, 120. The ribs 105, 114 help carry the loads from the airfoils 78 to the turbine case and associated seals. A "rib" has a circumferential width that is less that the circumferential width of an adjacent dead-ended passage 124.

The connecting portions 110, 112, 113 provide stability to the core 94 and enable the manufacture of a one piece core for a large outer platform 76. The radial core portions 106 and the resultant radial cavities reduce the weight in the annular flange 88 as well as provide convection cooling.

Film cooling holes 122 extend from the gas flowpath surface 87 to the circumferential passage 120. Thus, fluid from the cooling source 90 enters an inlet 96 provided by the inlet passage 118 and flows radially inwardly into the circumferential passage 120, which provides cooling fluid to the film cooling holes 122 and gas flowpath surface 87. The dead-ended passages 124 are simply filled with cooling fluid.

Although an example embodiment has been disclosed, a worker of ordinary skill in this art would recognize that certain modifications would come within the scope of the claims. For that reason, the following claims should be studied to determine their true scope and content.

What is claimed is:

1. A stator vane for a gas turbine engine comprising:
an airfoil extending in a radial direction and supported by a platform having a gas flowpath surface, a cooling passage arranged in the platform and including a circumferential passage fluidly connected to an inlet passage extending through an edge of the platform, and film cooling holes extending from the gas flowpath surface to the circumferential passage, radically extending passage through the edge of the platform, and a void interconnected to at least one of the radially extending passage and the inlet passage.

2. The stator vane according to claim 1, wherein the void includes multiple circumferentially spaced dead-ended radial passages separated circumferentially by ribs.

3. The stator vane according to claim 1, wherein the platform includes a circumferential support to which the airfoil is mounted and an annular flange extends in the radial direction from the circumferential support, the cooling passage arranged within the annular flange.

4. The stator vane according to claim 3, comprising inner and outer platforms radially spaced apart from one another and adjoined by the airfoil, the cooling passage provided in the outer platform.

5. The stator vane according to claim 4, wherein multiple airfoils adjoin the inner and outer platforms.

6. The stator vane according to claim 2, wherein multiple cooling passages extend to the edge provided by the annular flange, with at least one of the passages blocked by a plug weld to provide at least one of the dead-ended radial passages.

7. The stator vane according to claim 6, wherein the cooling passage includes radial passages spaced from the edge and without a plug weld.

8. The stator vane according to claim 7, wherein the cooling passage includes four dead-end radial passages.

9. The stator vane according to claim 1, wherein the ribs are elongated in the radial direction.

10. The stator vane according to claim 9, wherein a rib provides an L-shaped structure.

11. The stator vane according to claim 2, comprising a core arranged within and providing the cooling passage, the core including multiple core portions extending beyond the edge of the platform.

12. The stator vane according to claim 11, wherein a first connecting portion interconnects an inlet core portion providing the inlet passage and a first core portion, both inlet and first core portions extending beyond the edge.

13. The stator vane according to claim 12, wherein a second connecting portion interconnects a third core portion extending beyond the edge to a circumferential core portion, which is also connected to the inlet and first core portions.

14. The stator vane according to claim 13, wherein a third connecting portion interconnects radial core portions to one another, the radial core portions providing at least some of the dead-ended radial passages.

* * * * *

UNITED STATES PATENT AND TRADEMARK OFFICE
CERTIFICATE OF CORRECTION

Page 1 of 1

PATENT NO.        : 9,080,452 B2
APPLICATION NO.   : 13/630419
DATED             : July 14, 2015
INVENTOR(S)       : Mark A. Boeke It is certified that error appears in the above-identified patent and that said Letters Patent is hereby corrected as shown below:

IN THE CLAIMS:

In claim 1, column 6, line 33; delete "radically" and replace with --radially--

Signed and Sealed this
Seventeenth Day of November, 2015

Michelle K. Lee
*Director of the United States Patent and Trademark Office*